(12) United States Patent
Katou et al.

(10) Patent No.: US 8,237,053 B2
(45) Date of Patent: Aug. 7, 2012

(54) POWER SUPPLY APPARATUS FOR SLIDABLE STRUCTURE

(75) Inventors: Mitsunobu Katou, Kosai (JP); Tomoaki Nishimura, Kariya (JP); Motonari Inagaki, Kariya (JP)

(73) Assignees: Yazaki Corporation, Tokyo (JP); Aisin Seiki Kabushiki Kaisha, Aichi (JP)

( * ) Notice: Subject to any disclaimer, the term of this patent is extended or adjusted under 35 U.S.C. 154(b) by 228 days.

(21) Appl. No.: 12/724,062

(22) Filed: Mar. 15, 2010

(65) Prior Publication Data

US 2010/0243318 A1 Sep. 30, 2010

(30) Foreign Application Priority Data

Mar. 30, 2009 (JP) .................. 2009-081194

(51) Int. Cl.
*H02G 3/04* (2006.01)

(52) U.S. Cl. ............... 174/72 A; 174/68.1; 174/68.3; 174/97; 439/501; 439/502; 211/26; 361/826

(58) Field of Classification Search ............... 174/72 A, 174/68.1, 68.3, 69, 97; 248/49, 629; 439/501, 439/502; 361/826; 211/26
See application file for complete search history.

(56) References Cited

U.S. PATENT DOCUMENTS

| 7,341,478 | B2 * | 3/2008 | Tsubaki et al. ............... 439/501 |
| 7,375,281 | B2 * | 5/2008 | Kogure et al. ............... 174/72 A |
| 7,381,897 | B2 * | 6/2008 | Nishijima et al. ........... 174/72 A |
| 2008/0128232 | A1 | 6/2008 | Aoki et al. |
| 2009/0095858 | A1 | 4/2009 | Katou et al. |
| 2009/0223132 | A1 | 9/2009 | Aoki et al. |

FOREIGN PATENT DOCUMENTS

| EP | 2 081 270 A1 | 7/2009 |
| JP | 2008-113510 A | 5/2008 |
| JP | 2008-148539 A | 6/2008 |
| JP | 2009-065814 A | 3/2009 |

* cited by examiner

*Primary Examiner* — Dhirubhai R Patel
(74) *Attorney, Agent, or Firm* — Sughrue Mion, PLLC

(57) ABSTRACT

A power supply apparatus for a slidable structure which extends longitudinally, including: a pivotably-supported ring arm; a wiring harness having one end portion fixed to a tip portion of the ring arm and the other end portion fixed to a stationary structure; and an elastic member configured to bias the ring arm in a forward and upward direction. The ring arm is moved or rotated in a backward and downward direction while elastically deforming the elastic member due to tensile force of the wiring harness, when the slidable structure is moved forward toward its fully closed state. Also, the ring arm is moved or rotated in a forward and upward direction due to restoring force of the elastic member, when the slidable structure is moved backward toward its fully open state.

3 Claims, 3 Drawing Sheets

POWER SUPPLY APPARATUS FOR SLIDABLE STRUCTURE

CROSS-REFERENCE TO RELATED APPLICATIONS

The present Application claims priority to Japanese Patent Application No. 2009-081194 filed on Mar. 30, 2009, the entire disclosure of which is expressly incorporated herein by reference.

BACKGROUND OF THE INVENTION

1. Field of the Invention

The present invention relates to a power supply apparatus for a slidable structure, for example, an apparatus for constant power supply via a wiring harness to a sliding door of a vehicle.

2. Description of the Related Art

FIG. 2 shows an example of conventional power supply apparatus for a slidable structure. See Japanese Publication of Patent Application No. 2008-148539A (in particular, FIGS. 8(c) and 10)

This conventional power supply apparatus 41 has a pivotably-supported ring arm 43 inside an approximately trapezoidally-shaped protector 42, which is formed of synthetic resin, and is located in the sliding door of an automobile, and a metallic torsion spring for exerting a forward force on the ring arm 43. The power supply apparatus 41 has a portion 45 for holding a wiring harness 46 (i.e., a wiring harness holding portion 45) at the tip of the ring arm 43. In this configuration, the wiring harness 46 is arranged from a fixture 47 for wiring harness disposed in the front end of the protector 42 via the wiring harness holding portion 45 to a fixture 49 for wiring harness disposed on the side of an automobile body. The wiring harness 46 extends through an elongated lower opening 48 of the protector 42 before reaching the fixture 49.

Japanese Publication of Patent Application No. 2008-148539A discloses a power supply apparatus (not shown) having a secondary arm rotatably disposed in the tip portion of the ring arm 43, and the wiring harness holding portion 45 disposed in the secondary arm.

As other type of power supply apparatus that is similar to the afore-mentioned power supply apparatus 41, a power supply apparatus 20 as shown in FIG. 3 can be referred to. FIG. 3 depicts a sliding door in its fully closed position (right), and its fully open position (left).

The power supply apparatus 20 is shown to include a ring arm 24 that is pivotably or rotatably supported inside a protector 23, which is formed of synthetic resin, and is located adjacent to the sliding door of an automobile, and a metallic torsion spring 26 configured to exert an upward force on the ring arm 24 in a clockwise direction. The power supply apparatus 41 also has a secondary arm 25 rotatably disposed in the tip of the ring arm 24, and a wiring harness holding portion 27 disposed in the secondary arm 25. In this configuration, the wiring harness 28a, which is led into the protector 23 through a front end of the protector 23, is arranged from the arc lower opening 29 via the wiring harness holding portion 27 to a fixture 30 for wiring harness disposed on the side of automobile body. The wiring harness 28 is arranged between the foot area 31 of the door trim and the automobile body. The protector 23 has a base portion 21 and a cover portion 22 which is drawn in a dashed double dotted line.

When the sliding door is in its fully closed position, the force exerted by the torsion spring 26 is almost weakened. As a result, the wiring harness 28 proceeds obliquely downward toward the fixture 30, and is led in a posterior direction. When the sliding door is in its fully open state, the torsion spring 26 is twisted in a counterclockwise direction so that the wiring harness 28 bends in U-shape inside the protector 23 and is approximately horizontally led in an forward direction through a lower opening 29 of the protector 23 toward the fixture 30.

Meanwhile, when the sliding door is in its fully open state, the torsion spring 26 is twisted in a large amount. Therefore, in order to open the sliding door, greater force is generally needed against such a great force of the torsion spring. As a result, operation performance when manually opening the sliding door is poor. Also, greater dynamic power of motor is needed to open an automatic sliding door.

Furthermore, when the sliding door is in its fully closed state, the torsion spring 26 is twisted in a small amount. Under such circumstances, because only small amount of tension or tensile force acts on the wiring harness 28, the wiring harness 28 possibly flip-flops, thereby creating abnormal noise while the automobile running.

The afore-mentioned drawbacks and problems are present in not only the sliding door of the automobile, but also the sliding door of a vehicle other than automobile, and sliding door of any apparatus other than a vehicle. These sliding doors collectively are referred to herein as slidable structures, or sliding structures, and vehicle body or the like are collectively referred to herein as fixed or stationary structure(s)

SUMMARY OF THE INVENTION

The present invention is intended to provide a power supply apparatus for a slidable structure, capable of decreasing force needed to open the slidable structure, as well as, suppressing unnecessary or excessive movement of a wiring harness when the slidable structure is moved to its fully closed state.

In one aspect of the present invention, there is provided a power supply apparatus which comprises a pivotably-supported ring arm, a wiring harness having one end portion fixed to a tip portion of the ring arm and the other end portion fixed to a stationary structure, and an elastic member configured to bias the ring arm in a forward and upward direction. Such a power supply apparatus is disposed in a slidable structure which extends longitudinally. In the above power supply apparatus, the ring arm is rotated or moved in a backward and downward direction while elastically deforming the elastic member due to tensile force of the wiring harness, when the slidable structure is moved forward toward its fully closed state. On the other hand, the ring arm is rotated or moved in a forward and upward direction due to restoring force of the elastic member, when the slidable structure is moved backward toward its fully open state.

DETAILED DESCRIPTION OF THE INVENTION

One embodiment of a power supply apparatus for a slidable structure in accordance with the present invention will be described in more detail referring to the accompanying drawings.

Figure 1:
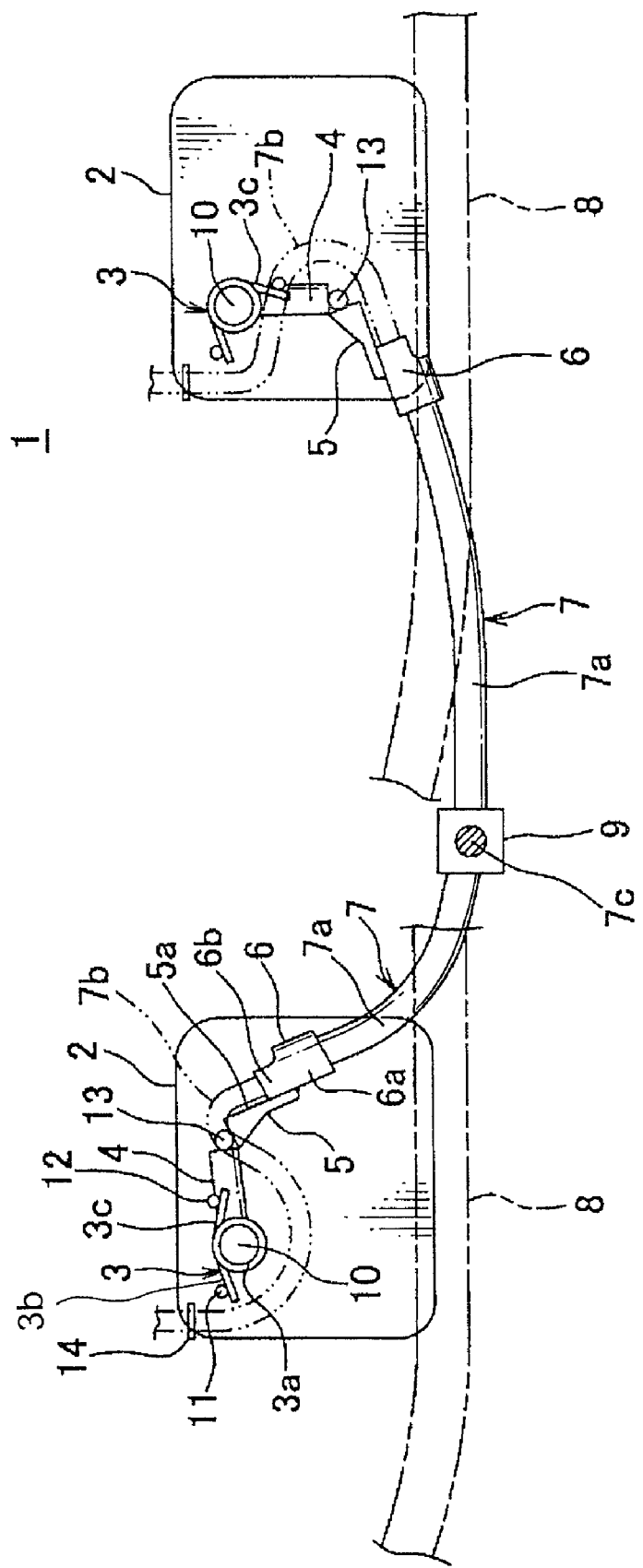
FIG. 1 is a front view of one embodiment of a power supply apparatus for a slidable structure in accordance with the present invention with the slidable structure open (left) and closed (right).
Figure 2:
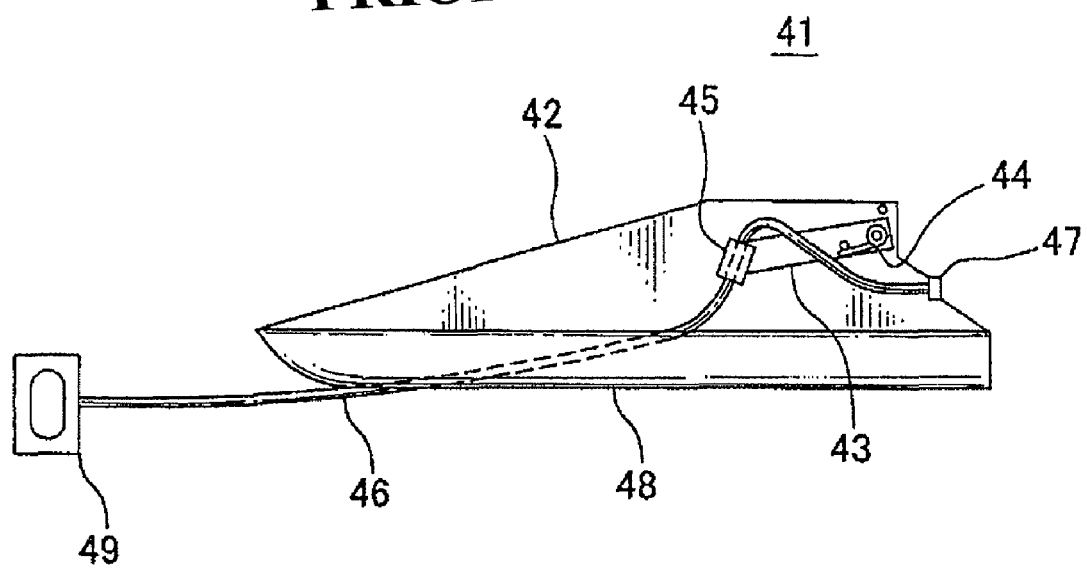
FIG. 2 is a front view of one embodiment of conventional power supply apparatus for a slidable structure.

FIG. 1 shows one embodiment of a power supply apparatus for a slidable structure in accordance with the present invention. FIG. 1 shows the slidable structure in its fully closed state (right), and in its fully open state (left).

A power supply apparatus 1 has a torsion spring (i.e., an elastic member) 3 disposed on a upper posterior half portion of a vertical base plate 2, a ring arm 4 forward and upward biased by the torsion spring 3 in a counterclockwise direction, a second arm 5 disposed in the tip of the ring arm 4, and a wiring harness holding portion 6 disposed in the secondary arm 5. When a sliding door that is longitudinally disposed in a vehicle is fully closed, due to the tensile force of the wiring harness 7 the torsion spring 3 is greatly twisted downward and backward in a clockwise direction, and thus deformed. When the sliding door is moved to its fully open position, or is in its fully open position, the torsion spring 3 is restored upward and forward in a counterclockwise direction. The directions and orientations as used herein correspond to the directions and orientations of vehicle.

Figure 3:
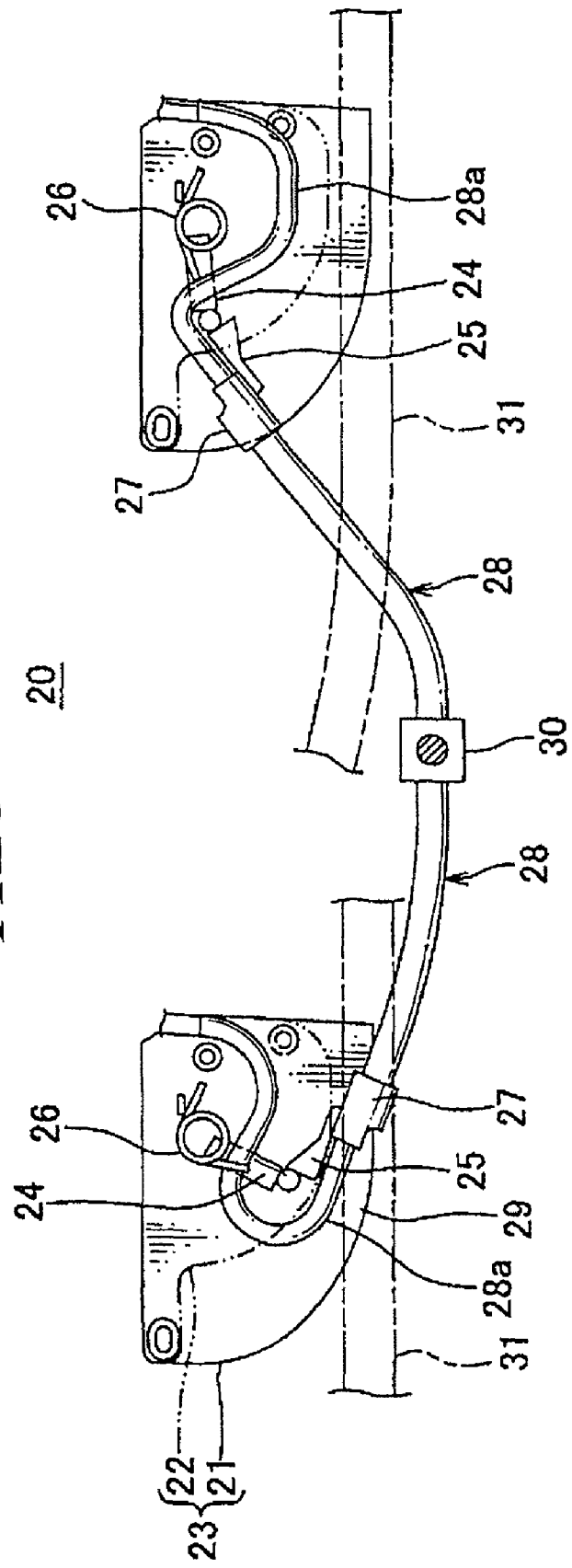
FIG. 3 is a front view of another embodiment of conventional power supply apparatus for a slidable structure with the slidable structure open (left) and closed (right).

The base plate 2 may be a base 21 of a protector 23 formed of synthetic resin, as shown in FIG. 3, may be used in an independent manner, or may be a portion of a metallic sliding door panel (not shown). In a case where only the protector base 21 or the base plate 2 is independently employed, it is preferably formed in a rectangular shape, as shown in FIG. 1. This is because the secondary arm 5 and/or the wiring harness holding portion 6 are prevented from moving downward and/or backward. The base plate 2 is fixed to the sliding door panel, and the wiring harness 7 extends from a foot area 8 of a door trim toward a fixture 9 for wiring harness disposed on the side of vehicle body (i.e., a fixed or stationary structure).

The torsion spring 3 is constructed such that a body coil 3a is freely fitted to a shaft 10 that is approximately vertically disposed on the upper and posterior portion of the base plate 2. The torsion spring 3 has two ends each of which is tangentially-arranged with respect to the body coil 3a, and is also referred to as a "leg". One end (i.e., the posterior end) 3b is fixed to a spring-receiving portion 11 of the base plate 2, and the other end (i.e., the anterior end) 3c is fixed to a spring-receiving portion 12 of the ring arm 4.

The ring arm 4 is linearly formed such that it has a length or less corresponding to approximately one half of the height of the base plate 2. The base end portion of the ring arm 4 is rotatably supported by or connected to the shaft 10. The secondary arm 5 which is shorter than the ring arm 4 is rotatably connected to the tip portion of the ring arm 4 via a small-diameter hinge shaft 13. The wiring harness holding portion 6 is fixed to a surface 5a of the secondary arm 5 which corresponds to an upper and inclined surface when the door is in its fully open position.

The wiring harness holding portion (i.e., a wiring harness holding member) 6 is shaped in a tube having a round or elongated cross-section such that it can clamp one end portion of a corrugated tube (i.e., a wiring harness protecting tube) 7a of the wiring harness 7. For more detail, the wiring harness holding portion 6 has a cross section corresponding to the cross section of the corrugated tube 7a. For example, the wiring harness holding portion 6 is radially-halved, and has a rib on its inner circumference. In this configuration, the rib can engage a groove (not shown) formed on the outer circumference of the corrugated tube 7a. The corrugated tube 7a is generally formed of synthetic resin.

The corrugated tube 7a is secured to a large-diameter portion 6a disposed at the tip of the wiring harness holding portion 6. An electrical conduit portion 7b of the wiring harness 7 extends through a small-diameter portion 6b disposed at base end side of the wiring harness holding portion 6. In this configuration, the electrical conduit portion 7b of the wiring harness 7 may be bent into a S shape within the base plate 2 so that it is fixed to the upper portion (i.e., a fixture 14) of the base plate 2, and is led toward auxiliaries or the like disposed in the sliding door.

The electrical conduit portion 7b may be bundled together by means of a tape, a belt or the like. Preferably, the electrical conduit portion 7b is covered by a flexible network-type tube (not shown) in the light of flexibility. The other end of the corrugated tube 7a is fixed to the fixture 9 for the wiring harness (i.e., the wiring harness fixing portion 9) disposed on the side of the vehicle body in the same manner. In this configuration, an electrical conduit portion 7c disposed inside the corrugated tube 7 is led toward the vehicle body, and thus is connected to a wiring haring harness (not shown) disposed on the side of the vehicle body.

The sliding door (not shown) is arranged on the left side of the vehicle body. The sliding door is opened forward along a guide rail (not shown) disposed on the side of the vehicle body, as shown in FIG. 3. At the beginning of the opening operation, the sliding door moves away from the vehicle body side to the outmost portion in the across-the-width of the vehicle along the bent portion of the guide rail.

When the sliding door is in its fully closed position (FIG. 1, left), the wiring harness 7 is pulled backward while being supported by the fixture 9. At this situation, the ring arm 4 is rotated together with the secondary arm 5 at about 90 degrees in a clockwise direction. In other words, the ring arm 4 is approximately vertically disposed, and the secondary arm 5 is obliquely backward and downward disposed. The torsion spring 3 is twisted at about 90 degrees in a clockwise direction together with the ring arm 4, resulting in elastic deformation.

In other words, because the one end 3c of the torsion spring 3 is fixed to the ring arm 4, the torsion spring 3 is twisted against the force (i.e., elastic force) exerted by the torsion spring 3 itself, in keeping with the rotation of the ring arm 4. Due to restoring force, the ring arm 4 together with the wiring harness 7 is biased in a forward direction (i.e., a counterclockwise direction). The restoring force can prevent tension or tensile force of the wiring harness from lowering, and also prevent any noise or wear which may be created during the running of vehicle.

When the sliding door is moved from its fully closed position to its open position, the wiring harness 7 has a tendency to hang loosely between the sliding door and the vehicle body. However, due to such restoring force of the torsion spring 3, both the wiring harness 7 and the ring arm 4 are lifted.

When the sliding door is in its fully open state (FIG. 1, left), the torsion spring 3 is configured to lift the ring arm 4 up to level approximately equal to or higher than the torsion spring 3. In this configuration, the front end of the ring arm 4 is disposed in a forward direction, and the second arm 5 is obliquely forward and downward disposed. Accordingly, the wiring harness holding portion 6 is pulled up in an upward and backward direction with respect to the fixture 9.

As mentioned previously, during opening operation of the sliding door, contrary to the prior art in which the torsion spring is twisted against the force exerted by the torsion spring, the torsion spring 3 is forced to liberate the restoring force. As a result, less force is needed to open the sliding door.

In other words, a load to a user is greatly relieved during manual opening operation of the sliding door, and power consumption is greatly decreased during automatic opening operation of the sliding door.

While the embodiment employs the torsion spring 3 as an elastic member, the torsion spring can be substituted by, for example, a metallic flat spring (not shown). In the case of using the flat spring, the base end portion of the flat spring is fixed via one spring-receiving portion 11 to the base plate 2, and the tip portion of the flat spring is configured to exert an upward force on the ring arm 4 in the other spring-receiving portion 12. In this situation, the ring arm 4 is moved or rotated in a counterclockwise direction. In this embodiment, it is desired that the flat spring in which two ends are connected to each other via a middle bent portion is employed. However, when the flat spring is used, a structure for fixing the flat spring has a tendency to be complicated, and be enlarged in comparison with the torsion spring.

Furthermore, in accordance with the afore-mentioned embodiment, the secondary arm 5 is connected to the tip portion of the ring arm 4 via the hinge shaft 13. However, even if the secondary arm 5 were not necessarily rotated, the rotation of the ring arm 4 would allow for smooth moving and floating of the wiring harness 7. Therefore, it is possible to employ a bent long ring arm integrally formed with a secondary arm (not shown). Contrary to the combination of the short-type ring arm 4 and the secondary arm 5 as shown in FIG. 1, such a long-type ring arm is at least partly defined by the secondary arm.

In a case where the corrugated tube 7 is not employed, and thus a plurality of electrical conduits (i.e., the electrical conduit portion 7b) is bundled together by means of a tape, a belt, or the like, or is covered by a network-type tube or the like, the wiring harness holding portion 6 may not be necessary. This is because the wiring harness holding portion 6 is designed to correspond to the shape (i.e., a cross section) of the corrugated tube 7a. If the wiring harness holding portion 6 were not employed, the wiring harness 7 might be directly secured to the ring arm 4 and/or the secondary arm 5 by means of a tape, a belt or the like.

In accordance with one aspect of the present invention, the tension or tensile force of the wiring harness can be maintained due to the force exerted by the elastic member, when the sliding door is moved to its fully closed state or is in its fully closed state. Accordingly, any noise or wear which may be created during the running of a vehicle can be effectively prevented. Furthermore, during the opening operation of the sliding door, the restoring force of the elastic member is gradually liberated, and thus a force needed for such opening operation is relieved. Accordingly, a load to a user is greatly relieved during manual operation of the sliding door, and power consumption is greatly decreased during automatic operation of the sliding door.

In accordance with another aspect of the present invention, the use of the torsion spring as an elastic member allows for the reduction of in size and weight, as well as, simplification of the power supply apparatus, in particular, the constitution for exerting a force on the ring arm.

In accordance with the other aspect of the present invention, at the tip portion of the ring arm a secondary arm is rotatably connected to the ring arm, and wherein the one end portion of the wiring harness is fixed to the secondary arm. Because the rotatably-disposed secondary arm can relax or relieve bending force of the wiring harness, the wiring harness can be smoothly bent, thus allowing for smoother opening and closing of the slidable structure.

While the presently preferred embodiment has been disclosed, one skilled in the art would understand that various modifications would come within the scope of the invention as defined by the following claims.

The invention claimed is:

1. A power supply apparatus for a slidable structure, comprising:
   a pivotably-supported ring arm;
   a wiring harness having one end portion fixed to an end portion of the ring arm, and the other end portion fixed to a stationary structure; and
   an elastic member configured to bias the ring arm in a forward and upward direction,
   wherein the power supply apparatus is disposed in the slidable structure which extends longitudinally,
   wherein when the slidable structure is moved forward toward its fully closed state, the ring arm is rotated or moved in a backward and downward direction while elastically deforming the elastic member due to tensile force of the wiring harness, and
   wherein when the slidable structure is moved backward toward its fully open state, the ring arm is rotated or moved in a forward and upward direction due to restoring force of the elastic member.

2. The power supply apparatus according to claim 1, wherein the elastic member is a torsion spring.

3. The power supply apparatus according to claim 1, wherein at the end portion of the ring arm a secondary arm is rotatably connected to the ring arm, and wherein the one end portion of the wiring harness is fixed to the secondary arm.

\* \* \* \* \*